May 31, 1960 M. R. CANNON 2,939,016
DETECTING APPARATUS
Filed Nov. 20, 1956 3 Sheets-Sheet 1

INVENTOR.
MAXWELL R. CANNON
BY Donald F. Voss
ATTORNEY.

May 31, 1960 M. R. CANNON 2,939,016
DETECTING APPARATUS
Filed Nov. 20, 1956 3 Sheets-Sheet 2

United States Patent Office 2,939,016
Patented May 31, 1960

2,939,016
DETECTING APPARATUS

Maxwell R. Cannon, Endwell, N.Y., assignor to International Business Machines Corporation, New York, N.Y., a corporation of New York Filed Nov. 20, 1956, Ser. No. 623,482

10 Claims. (Cl. 250—219)

This invention relates to a device and method for detecting perforations in sheet or web stock and more particularly to a device and method for detecting minute perforations in sheet or web stock normally light transmissive.

This invention may be employed to detect perforations which have been intentionally entered into the sheet or web stock as well as detecting perforations which exist in said sheet or web stock.

If the invention is employed to detect perforations intentionally entered, it may be termed as "a hole reader," whereas if it is used to detect perforations existing in the sheet or web stock, it may be termed as "a hole detector." These designations are arbitrary; however, the distinction is well made, since the embodiment of the invention will vary with the intended use, although the underlying principles remain the same. In detecting perforations intentionally entered into the sheet or web stock, the hole reader may be discretely positioned in correspondence with each hole position, since the index positions of the perforations are known, such as in record cards used to control tabulating, statistical, and other like machines. The exact position of the perforations existing in the sheet or web stock is not known, and therefore, the entire area of the stock must be scanned. The "hole detector" would be used to detect perforations existing in the sheet or web stock which cannot be tolerated. Of the many applications of this invention, a few will be described.

In the manufacture of record cards which are used to control the operation of tabulating, computing, statistical and other like machines, it is essential that the record card be free from perforations of particular dimensions not intended to be in the card, otherwise the machine would operate in an unintended manner. The size of the unintended perforation determines whether or not the perforation may be tolerated. If the mechanism for sensing intended perforations is insensitive to perforations of a particular size, then it becomes unnecessary to eliminate those record cards having perforations insensible to the sensing means. The sensitivity of the "hole reader" would be set to read holes of a particular dimension which would be of a size practical to the extent that an excessive number of cards would not be rejected during card manufacturing for the reason that the cards contain holes sensitive to the "hole reader." In other words, the capacity of the record card may be increased over the capacity for the normal record card of known use, but a practical limit would exist, this limit being at the point where the expense of card manufacture would become greater than additional benefit derived from providing for a record card containing more information by utilizing a smaller size perforation.

An additional application of this invention would be to detect holes in such material as Saran, Mylar and other like materials where it is desirable to have the material free from perforations of a particular size and larger.

Accordingly, it is a principal object of this invention to provide an improved means to detect perforations in sheet stock normally light transmissive in the form of a moving web.

A further object of this invention is to provide an improved means to detect perforations in sheet stock normally light transmissive in the form of a moving sheet or card.

A still further object of this invention is to provide a simple device for detecting perforations in sheet stock normally light transmissive.

An additional object of this invention is to provide an improved means to detect perforations appearing in discrete positions in sheet stock normally light transmissive.

Another additional object of this invention is to provide an improved means to detect perforations appearing randomly in sheet stock normally light transmissive.

A further additional object of this invention is to provide an improved means to detect perforations appearing in various types of sheet stock which normally transmit visible light to lesser or greater amounts in accordance with the type of material involved.

A still further additional object of this invention is to provide an improved means to detect very minute perforations appearing in various types of sheet stock which normally transmit visible light to lesser or greater amounts in accordance with the type of material involved.

A different object of this invention is to provide an improved means to detect very minute perforations appearing in various types of sheet stock of various colors which normally transmit visible light to lesser or greater amounts in accordance with the type and color of material involved.

A further additional object of this invention is to detect very minute perforations in various types of sheet stock of various colors which normally transmit visible light to lesser or greater amounts in accordance with the type and color of material involved traveling at very high speeds.

Other objects of the invention will be pointed out in the following description and claims and illustrated in the accompanying drawings, which disclose, by way of examples, the principle of the invention and the best mode, which has been contemplated, of applying that principle.

Figure 1:
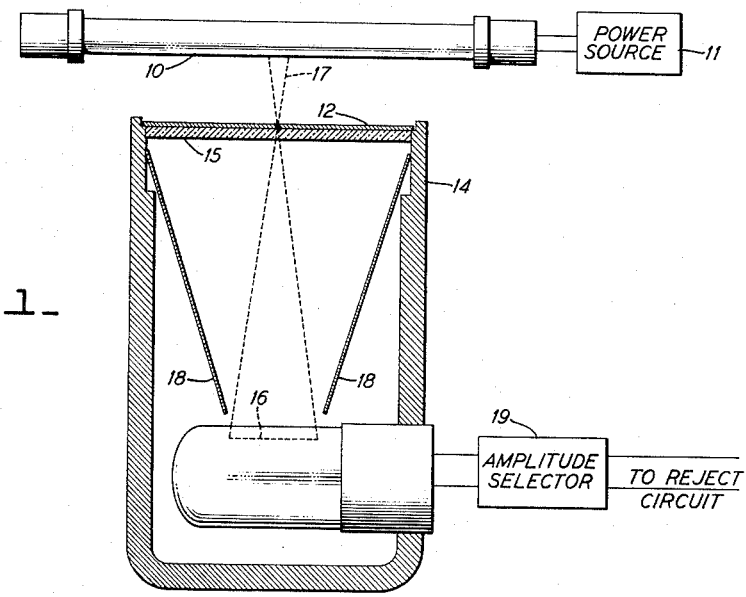
Fig. 1 is a side elevation of an embodiment of the invention as a "hole detector" showing the light tight housing with light guides.

It is quite simple to detect perforations appearing in materials normally opaque to visible light by the use of a source of luminous energy and a suitable light responsive element and having the opaque material pass between the luminous energy source and the light responsive element. However, this arrangement would not be suitable where the material is not normally opaque to visible light but rather transmits visible light, since it would be difficult to distinguish between the signal received by light passing through a perforation and energizing the light responsive element and the signal received by light passing through the material and energizing the light responsive element.

The present invention utilizes the results determined during investigation that many materials which are normally not opaque to visible light are substantially opaque to wave lengths in the ultraviolet region. Hence the amount of light of wave lengths in the ultraviolet region which passes through the material is negligible in comparison to the amount of light of said wave lengths which would pass through a perforation in said material and accordingly, an excellent signal is received when a perforation appears.

In general, the system for detecting holes comprises a light source disposed above a light tight housing having a narrow aperture filled with filter glass directed toward the light source. A photosensitive surface is contained within the housing beneath the filter glass. The sheet of material to be examined passes over the top of the light tight housing between the light source and the housing. The sheet material must be the same or slightly greater in width than the length of the aperture containing the filter glass, otherwise stray light could pass through the filter glass and activate the photosensitive surface to give an erroneous signal. The sensitivity of the system is dependent upon various factors. The light source should be of high intensity with a preponderate amount of radiation in the ultraviolet region. A tubular mercury vapor lamp which is commercially available serves as an excellent light source.

The aperture in the light tight housing should be narrow and in the neighborhood of .01 inch for high sensitivity. The filter glass contained in the aperture should prevent light waves above 4,000 angstroms from passing through to the photosensitive surface for translucent sheet material such as normal record card stock and should prevent light waves above 3,100 angstroms from passing for transparent material such as Mylar. The sheet materail should be passed over the filter glass in a manner to wipe it clean in passing in order to prevent the collection of dust particles which would reduce the sensitivity of the system. A commercially available filter such as that sold by the Corning Glass Company designated No. 9863 is quite suitable to filter wave lengths above 4,000 angstroms. The photosensitive surface should be sensitive to ultraviolet wave lengths and be low in dark current and noise. A suitable photosensitive surface is a commercially available photo-multiplier tube such as 1P28 which is sold by Radio Corporation of America. Since the output of the photo-multiplier tube varies with the amount of light impinging upon it, amplitude selection may be utilized to determine the size of holes which may be tolerated and the size which may not be tolerated.

Light guides with high reflective surfaces arranged within the light tight housing would provide for uniform sensitivity over the full width of the sheet being examined where the photosensitive surface is less in width than the sheet; however, light guides are unnecessary when a photosensitive surface having a width equal to the sheet being examined is used.

Hence the degree of sensitivity of the system is dependent upon the aforementioned parameters which are variable. By proper selection and adjustment of these parameters, a system embodying my invention may be arranged to satisfy a wide variety of requirements. The system has the facility of accommodating various types of light transmissible materials as well as different colors of such materials. Furthermore, the system is flexible to the extent of detecting holes of various sizes in the aforementioned materials which are moving at very high speeds.

Figure 2:
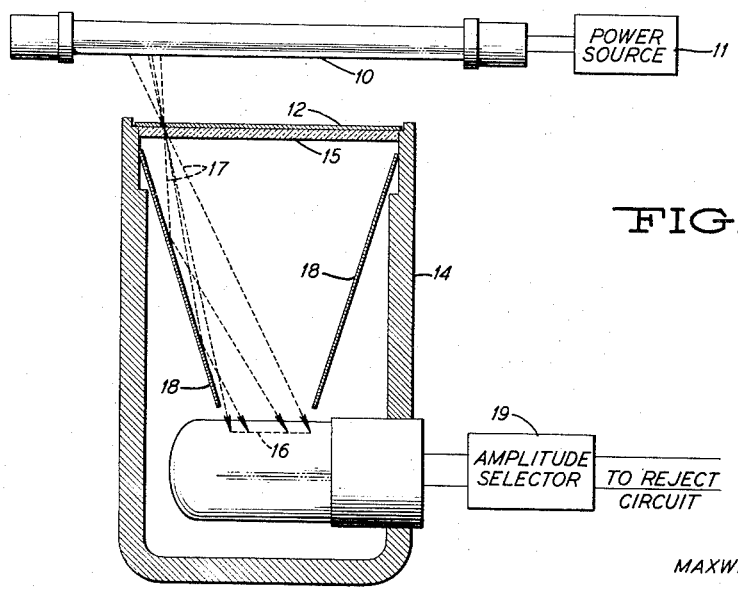
Fig. 2 is a side elevation illustrating the function of the light guides of an embodiment of the invention as a "hole detector."
Figure 4:
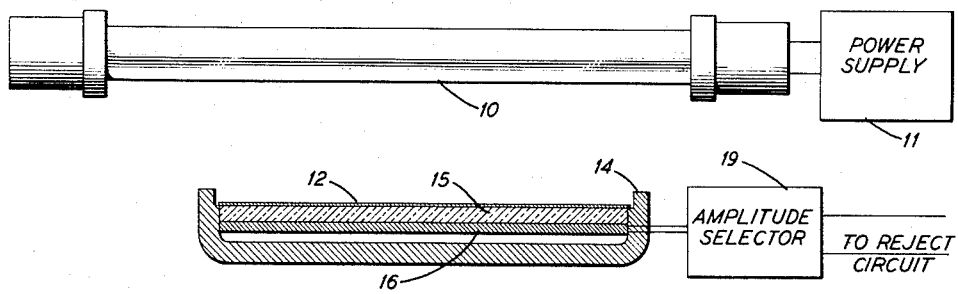
Fig. 4 is a side elevation of another embodiment of the invention as a "hole detector" showing the light tight housing without light guides.
Figure 3:
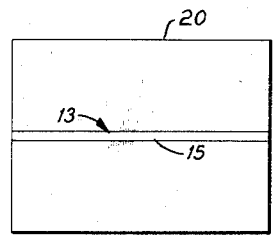
Fig. 3 is a detail plan view of the aperture in the light tight housing.

Referring to the drawings, Fig. 1 shows an embodiment for detecing minute perforations randomly appearing in sheet stock which normally transmit visible light. A tubular mercury vapor lamp 10 connected to suitable supply through a lamp ballast, rectifier and filter shown as a power supply 11 is positioned to uniformly illuminate moving sheet stock 12 which passes over a narrow longitudinal aperture 13 formed in a top member 20, Fig. 3, of a light tight housing 14. The top member 20 is fixed to extend between the sides of the housing 14 and is approximately equal to the width of the moving sheet stock 12. This aperture 13 is filled with a filter glass 15 capable of passing only wave lengths of light to which the material being examined is opaque. A photosensitive surface 16 responsive to the wave lengths passed is contained in the housing and is disposed beneath the filter glass 15. The exact location of the photosensitive surface 16 with respect to the filter glass 15 may vary in accordance with the size of the photosensitive surface 16 and the material being examined. Light from the lamp passes through any perforation appearing in the sheet material in the form of a cone 17 as shown in Fig. 1, and hence by placing the photosensitive surface further away from the sheet material, the diverging rays passing through a perforation near the edges of the sheet material 12 would impinge upon the photosensitive surface. Accordingly, the photosensitive surface 16 may be of the full width of the sheet material as in Fig. 4 or may be made somewhat smaller than the full width by locating the photosensitive surface further away from the sheet material as in Fig. 1. Where the photosensitive surface is less in width than the material being examined, light guides 18 as in Fig. 2 are used to direct the transmitted wave lengths onto the photosensitive surface 16. The housing 14 is made light tight to keep stray rays from impinging upon the photosensitive surface 16.

When a perforation appears in the sheet material, the wave lengths of light emitted from the lamp pass through the perforation, through the filter glass and impinge upon the photosensitive surface, thereby activating it to produce an electrical signal in a well-known manner. This signal is then passed through an amplitude selector 19 and if it is in the range selected, a pulse is emitted to operate a reject circuit.

The reject circuit which does not form a part of this invention may be of several well-known types. The reject circuit could be connected to a mechanism for marking the area containing the perforation, or a circuit could be connected to a circuit set up to remember where the perforation existed and furnish this information to a reject mechanism to reject the sheet after it had been cut to size.

Figure 5:
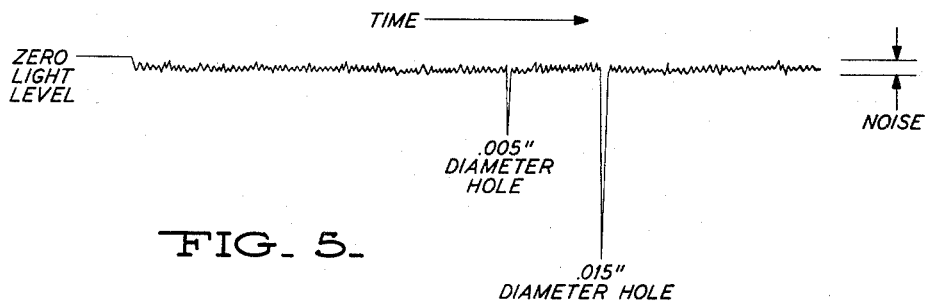
Fig. 5 is a diagram showing typical signals generated by holes appearing in the sheet stock being inspected by embodiments of the invention shown in Figs. 1 and 4.
Figure 8:
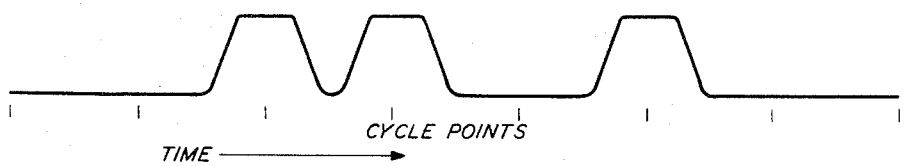
Fig. 8 is a diagram showing typical signals generated as a perforated record card is read by an embodiment of the invention as shown in Figs. 6 and 7.

Visible light which may pass through the card will not pass through the filter glass and therefore will not activate the photosensitive material and further, since the sheet material is opaque to the wave lengths passed by the filter, it will not pass these wave lengths to interfere with the wave lengths passed through the perforation. Hence a very good signal is obtained and no compensating mechanism is needed for various colors and types of light transmissible sheet material. The most minute perforation may be detected by this invention and perforations of gradual increasing size may be detected by preselecting a particular amplitude necessary to operate the reject mechanism. Typical signals generated as light waves pass through a perforation appearing anywhere in the sheet material, through the filter glass and onto the photosensitive surface are shown in Fig. 5. It is seen that there is some background noise; however, signals obtained by very minute perforations being detected are greatly distinguishable over the background noise.

The invention in the form of a "hole reader" may be employed to read holes in record cards which are used to control the operation of business and other like machines. Moreover, the invention may be embodied to read a record card in either serial or parallel fashion. As a "hole reader" whether in serial or parallel fashion, an excellent signal to noise ratio is obtained, since the photosensitive surface is either fully illuminated or completely dark, inasmuch as a photosensitive surface is provided for each index position in a column of a record card for a serial reader and for each index position in a row for a parallel reader. In general, a mask plate having apertures corresponding to a column of index positions or a row of index positions forms a cover plate of a light tight housing containing photosensitive surfaces corresponding in size and position to the apertures. The centers of the apertures are in alignment with the centers of the index positions; however, the size of the apertures is slightly less than the space between index positions to prevent reading adjacent perforated index positions simultaneously. A single light source predominantly ultraviolet with low flicker is disposed to uniformly illuminate a record card as it passes over the apertures which contain filters to prevent light waves above 4,000 angstroms from passing onto the photosensitive surfaces. The signal generated as a hole is read is transmitted to an amplifier which amplifies the signal and from the amplifier it is transmitted to an operational circuit of some type. The techniques afore-described for increasing the sensitivity of the "hole detector" are for the most part available to increase the sensitivity of the "hole reader."

Figure 6:
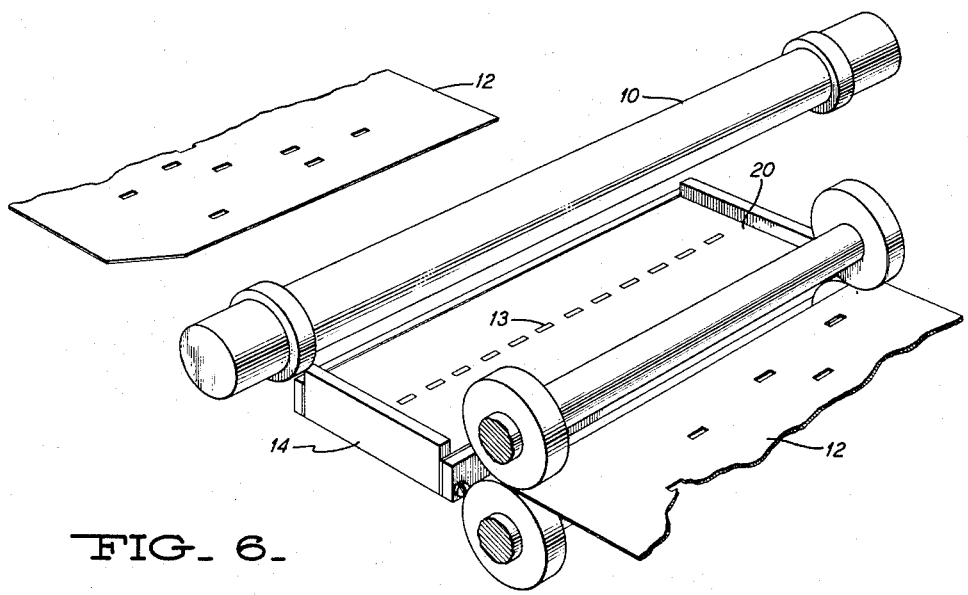
Fig. 6 is a perspective view of an embodiment of the invention as a "hole reader."
Figure 7:
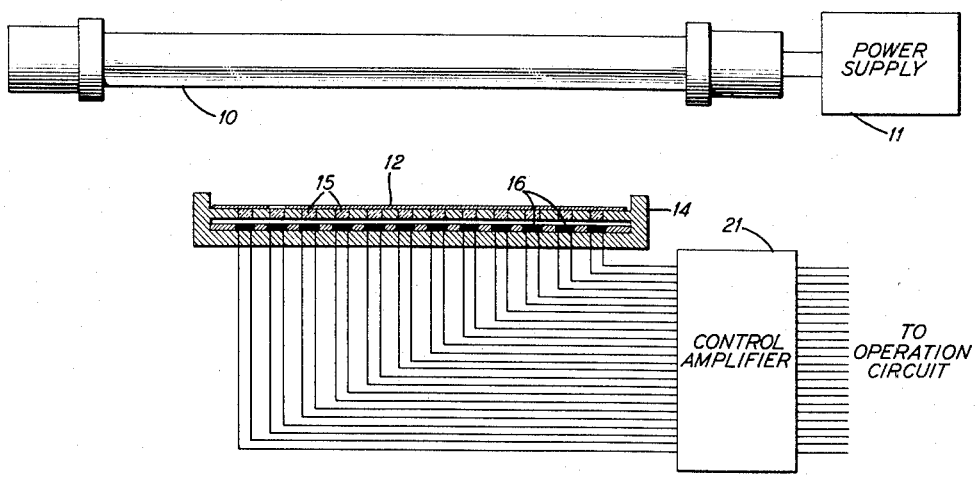
Fig. 7 is a side elevation of an embodiment of the invention as a "hole reader."

An embodiment of the invention as a "serial hole reader" is shown in Figs. 5 and 6. The structure required for a "hole reader" is essentially the same as that required for a "hole detector" and the same reference numerals will be used where the structure is identical. A tubular mercury vapor lamp 10 connected to a suitable supply through a lamp ballast, rectifier and filter shown as a power supply 11 is positioned to uniformly illuminate a moving record card 12 which passes over a face plate 20 having a series of apertures 13 corresponding in size and position to a column of index positions on the record card 12 being examined. The apertures are filled with filter glass 15 which transmits only those light waves to which the record is opaque. The face plate 20 forms the top of a light tight housing 14. A series of photosensitive surfaces 16 contained within the housing 14 is disposed beneath the filters 15 to correspond therewith. Electrical connections made to the photocells containing the photosensitive surfaces in a manner similar to electrical sensing brushes in record card controlled machines are lead to an amplifier 21 and from the amplifier to an operation circuit for the operation of a device of some type normally encountered in record card controlled machines. For improved performance the apertures 13 should be smaller than the area between index positions in the record card. Although satisfactory results are obtained with the structure described, suitable light guides could be positioned to prevent adjacent cells from being activated from light waves passing through a noncorresponding aperture.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In an apparatus for detecting perforations in sheet material light transmissive in the visible region of the spectrum comprising a light source predominantly ultraviolet, a light tight housing having a narrow longitudinal aperture formed in a top member directed toward said light source, said top member being substantially equal to the width of the sheet material being inspected, a filter in said aperture for passing light waves from said light source which are intransmissible by said sheet material and filtering out light waves transmissible by said sheet material, a means for moving said sheet material between said light source and filter, and a photosensitive surface contained in said housing to be activated by impinging light waves passed by said filter.

2. In an apparatus for detecting perforated index positions in record cards light transmissive in the visible region of the spectrum comprising a light source predominantly ultraviolet, a light tight housing having a narrow aperture directed toward said light source, a mask plate having a plurality of openings corresponding to index positions of said record card fixed to said housing and over said aperture with the openings in register therewith, a filter contained in each opening of said mask plate capable of passing light waves from said light source intransmissible by said record card and to filter out light waves transmissible by said record card, a means for moving said record card between said light source and filter and a photosensitive surface contained in said housing to correspond with each filter to receive the light waves passing therethrough and be activated thereby.

3. In an apparatus for detecting perforated index positions in a record card light transmissive in the visible region of the spectrum comprising a light source predominantly ultraviolet, a light tight housing having a plurality of apertures corresponding to a column of index positions of said record card directed toward said light source, a filter contained in each aperture capable of passing light waves from said source which are intransmissible by said record card and to filter out light waves transmitted by said record card, a means for moving said record card between said light source and filter, and a photosensitive surface contained in said housing to correspond with each filter to receive the light waves passing therethrough and be activated thereby.

4. In an apparatus for detecting perforated index positions in a record card light transmissive in the visible region of the spectrum comprising a light source predominantly ultraviolet, a light tight housing having a narrow aperture directed toward said light source, a mask plate having a plurality of openings corresponding to a column of index positions of said record card fixed to said housing over said aperture with the openings in register therewith, a filter contained in each opening of said mask plate capable of passing light waves from said light source which are intransmissible by said record card, a means for moving said record card between said light source and filter with the card in contact with the filter so as to wipe it clean in passing, a photosensitive surface contained in said housing to correspond with each filter to receive the light waves passing therethrough, and a series of light guides having highly reflective surfaces depending from said mask plate to encompass said filters in a manner to direct the passing light waves onto the corresponding photosensitive surfaces.

5. In an apparatus for detecting perforations in sheet material light transmissive in the visible region of the spectrum comprising a light tight housing having a narrow longitudinal aperture formed in a top member thereof, said top member being substantially equal to the width of the sheet material being inspected, a light source predominantly ultraviolet directed to illuminate said sheet material passing between it and the narrow aperture in the top member of said housing, a filter contained in said aperture for filtering out light waves above 4,000 angstroms, a means for moving said sheet material between the light source and housing, and a photosensitive surface contained in said housing to receive light waves passed by perforations in said sheet material by said filter.

6. In an apparatus for detecting perforated index positions in record cards light transmissive in the visible region of the spectrum comprising a light tight housing having a narrow aperture, a mask plate having a plurality of openings corresponding to a column of index positions of said record card fixed to said housing and over said aperture with the openings in register therewith, a light source predominantly ultraviolet directed to illuminate said record card passing between it and said light tight housing, a filter contained in the openings of said mask plate for filtering out all light waves above 4,000 angstroms, a means for moving said record card between the light source and housing, and a photosensitive surface contained in said housing to correspond with each filter to receive light waves passed by said filter.

7. In an apparatus for detecting perforated index positions in record cards light transmissive in the visible region of the spectrum comprising: a light tight housing having a plurality of apertures corresponding to a column of index positions of said record card, a light source predominantly ultraviolet directed to illuminate said record card passing between it and said light tight housing, a filter contained in said apertures for filtering out all light waves above 4,000 angstroms, a means for moving said record card between the light source and housing, and a photosensitive surface contained in said housing to correspond with each filter to receive light waves passing through perforated index positions in said record card and through said filters to be activated thereby.

8. In an apparatus for detecting perforated index positions in record cards light transmissive in the visible region of the spectrum comprising a light tight housing having a narrow aperture, a mask plate having a plurality of openings corresponding to a row of index positions of said record card fixed to said housing and over said aperture with the openings in register therewith, a light source predominantly ultraviolet directed to illuminate said record card passing between it and said light tight housing, a filter contained in the openings of said mask plate for filtering out all light waves above 4,000 angstroms, a means for moving said record card between the light source and housing and over the filters so as to wipe them clean in passing, and a photosensitive surface contained in said housing to correspond with each filter to receive light waves passing through perforated index positions in said record card and through said filters and be activated thereby.

9. In an apparatus for detecting perforated index positions in record cards light transmissive in the visible region of the spectrum comprising: a light tight housing having a plurality of apertures corresponding to a row of index positions of said record card, a light source predominantly ultraviolet directed to illuminate said record card passing between it and said light tight housing, a filter contained in said apertures for filtering out all light waves above 4,000 angstroms, a means for moving said record card between the light source and housing, and a photosensitive surface contained in said housing to correspond with each filter to receive light waves passing through perforated index positions in said record card and through said filters to be activated thereby.

10. In an apparatus for detecting perforated index positions in record cards light transmissive in the visible region of the spectrum comprising a light tight housing having a narrow aperutre, a mask plate having a plurality of openings corresponding to a row of index positions of said record card fixed to said housing and over said aperture with the openings in register therewith, a light source predominantly ultraviolet directed to illuminate said record card passing between it and said light tight housing, a filter contained in the openings of said mask plate for filtering out all light waves above 4,000 angstroms, a means for moving said record card between the light source and housing and over the filters so as to wipe them clean in passing, a photosensitive surface contained in said housing to correspond with each filter to receive light waves passing through perforated index positions in said record card and through said filters to be activated thereby, and a series of light guides having highly reflective surfaces within said housing to encompass said filters to direct the passing light waves onto corresponding photosensitive surfaces.

References Cited in the file of this patent

UNITED STATES PATENTS

| | | |
|---|---|---|
| 1,963,185 | Wilson | June 19, 1934 |
| 2,246,906 | Viebahn et al. | June 24, 1941 |
| 2,341,934 | Martin | Feb. 15, 1944 |
| 2,438,588 | Tolson | Mar. 30, 1948 |
| 2,563,213 | Coleman | Aug. 7, 1951 |
| 2,758,712 | Linderman | Aug. 14, 1956 |
| 2,762,930 | Onksen et al. | Sept. 11, 1956 |